July 3, 1962      J. L. W. JACOBSEN      3,041,935

ANAMORPHOTIC LENS SYSTEM

Filed Aug. 18, 1958      2 Sheets-Sheet 1

INVENTOR
JAN LOUIS WULFF JACOBSEN

BY Robert H. Jacob.
AGENT

United States Patent Office 3,041,935
Patented July 3, 1962

3,041,935
ANAMORPHOTIC LENS SYSTEM
Jan Louis Wulff Jacobsen, % Arnold & Richter KG,
Turkenstrasse 89, Munich 13, Germany
Filed Aug. 18, 1958, Ser. No. 755,473
1 Claim. (Cl. 88—57)

This invention relates to anamorphotic apparatus consisting of a basic optical device (photographing objective of a film camera) and an afocal anamorphotic lens system inserted in the path of rays of the basic optical device between the latter and the object. An object of the invention is to improve such anamorphotic lenses (or anamorphotes) in such a manner that the barrel-like distortions, which occur in the images produced thereby, are obviated. The invention aims especially at rendering possible the use of such anamorphotes in the case of film photography with short focal lengths without the occurrence of distortions in the picture. Another object of the invention is to obviate the reduction of compression, which occurs on the focussing of anamorphote lenses, on sharpness adjustment to a near object.

In order to atain these objects, various expedients are employed in accordance with the proposals of the invention.

In accordance with the invention, there is provided anamorphotic apparatus comprising a basic optical device, such as the normal objective lens system of a camera, and an anamorphotic lens system inserted, or adapted to be inserted, in the path of the light passing through the said basic optical device, and comprising two groups of lenses, each group including two cylindrical lenses, the axes of symmetry of which are parallel, and each group having its axes of symmetry at right angles to the axes of symmetry of the other group, one of said groups (hereafter called the compressing group) carrying out an image-compression in a first direction and the other of said groups (hereafter called the expanding group) carrying out an image-expansion in a second direction at right angles to said first direction, the extent of said image-compression and image-expansion being such that the quotient of the compression factor relating to the said first direction and the expansion factor relating to the said second direction is substantially equal to a predetermined standard compression factor.

The phenomenon utilised is that a compressing anamorphote produces a barrel-shaped image distortion whilst an expanding anamorphote produces a cushion-shaped distortion and that, on the simultaneous use of two anamorphotes inserted in the manner described, the distortion produced by one of them is annulled by that of the other.

In order to be able to use films, which have been photographed with such anamorphotes, in projection devices which usually operate with the same standardised compression, it is only necessary to take care that the resulting compression, i.e. the quotient of the horizontal compression factor and the vertical compression factor, is equal to the desired (standardised) compression. This can be obtained by suitable selection of the radii of curvature of and of the distances between the lenses.

The diminution of the picture angle, which is produced on the insertion of the new anamorphote, by the additional vertical expansion, is restored by the employment of a basic optical device with a correspondingly shorter focal length (for example 35 mms. instead of 40 mms.). In order to prevent a diminution of the compression on adjustment of sharpness to near objects when photographing, the negative cylindrical lens of the compressing group is, in the apparatus according to the invention, divided into two axially parallel cylindrical lenses.

Furthermore, in accordance with the invention the distance of the cylindrical lenses of the expanding group from each other is made equal to the distance of the two negative cylindrical lenses of the compressing group from each other and the second negative cylindrical lens of the compressing group and the negative lens of the expanding group are arranged to be situated at a common point on the optical axis of the system.

In addition, the second negative cylindrical lens of the compressing group and the negative cylindrical lens of the expanding group have the same focal length and therefore equal power of refraction.

Consequently, it is possible, according to this invention, to constitute the two last mentioned cylindrical lenses by a spherical lens of the same focal length as these lenses. Only this one spherical lens is then moved for focussing the two groups of lenses. Owing to the common movement of the focussing lens of the two groups of lenses, the resulting compression factor remains very constant on focussing, because, when the compression factor of one group is reduced, the expansion factor of the other group is increased at the same time, or vice versa.

A further simplification in manufacture is produced, within the scope of the invention, if, after increasing the refractive power of the cylindrical surface of the negative lens of the compressing group by the numerical value of the refractive power of the positive cylindrical lens of the expanding group of these two lenses, these two lenses are replaced by a lens with a spherical front surface and a concave cylindrical back surface.

In order to obtain a sufficient achromatism, it was found to be advantageous in the case of the invention not to achromatise the front lenses of these two groups but, instead of this, to insert, between these two lenses and the focussing lens, an approximately afocal element consisting of crown-glass and flint lenses the axes of the cylindrical planes of which cross each other at right angles and which are cemented together. The other lenses may be achromatised.

For the purpose of thoroughly eliminating picture errors, such as curvature of pictures, spherical aberration, astigmatism and coma, it is advantageous to replace the flat surfaces of all or some of the lenses, which have them, by spherical surfaces.

In order that this invention may be more readily understood, the origination of the lens system will now be described with reference to the accompanying drawings, in which.

The drawings illustrate the invention on the whole only diagrammatically. The mounts, which are used for the mutual support of the lenses and groups of lenses, are not shown nor are the means for adjusting the focussing lenses in relation to the basic optical device by displacement in the direction of the principal axis. Such mounts and moving mechanisms are known and used in the case of the objective according to the invention.

In the figures, O denotes the basic optical device. The line beneath the basic optical device in FIGURES 1 to 5 or on the right of the optical device in FIGURES 6 and 7 denotes the focal plane.

Figure 1:
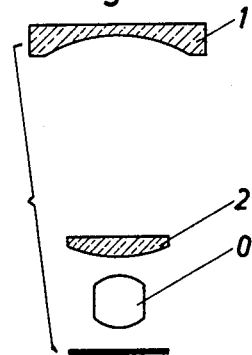
FIGURES 1 and 2 show in cross-section, a diagrammatic representation of anamorphotic photographic apparatus according to the invention, the individual groups of lenses being represented separately.
Figure 2:
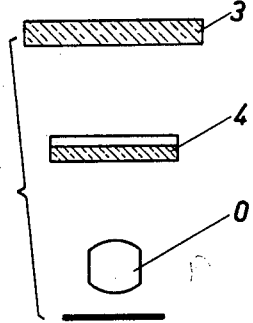
Figure 2A:
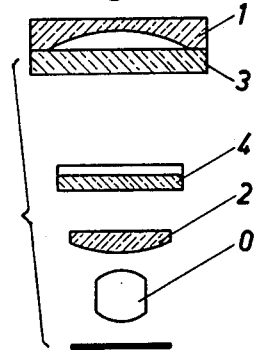
FIGURE 2a shows the lenses of the apparatus of FIGS. 1 and 2 in assembled relationship.

FIGURE 1 represents the known arrangement of an horizontal compressing anamorphote with a negative front lens 1 and a positive back lens 2. FIGURE 2 shows the arrangement of a vertical expending anamorphote with a positive front lens 3 and a negative back lens 4, the cylinder axes of which, that are parallel to each other, have been rotated, with respect to the view of FIGURE 1, through an angle of 90° about the principal axis. If, now, the anamorphote shown in FIGURE 2 is displaced to the left between the two lenses shown in FIGURE 1, the embodiment of the invention first described is obtained. In such a system, therefore, there is, in front of the basic optical device O, an anamorphotic lens system of two groups 1, 2 and 3, 4 whose axes of symmetry cross each other at right angles, and each having two cylindrical lenses 1 and 2 or 3 and 4, the axes of symmetry of which are parallel and one group of which 1, 2 (compressing group) produces a picture-compression horizontally whilst the other group 3, 4 (expanding group) produces a picture-expansion vertically.

Figure 3:
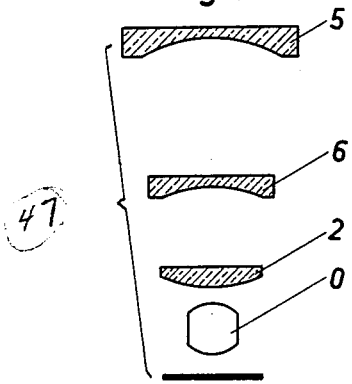
FIGURES 3 and 4 show another embodiment of the invention, represented in the same way as in FIGURES 1 and 2.
Figure 4:
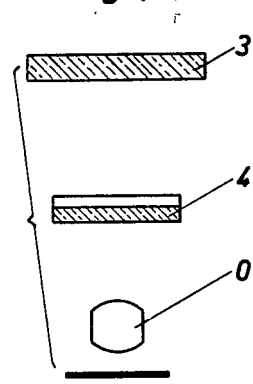
Figure 4A:
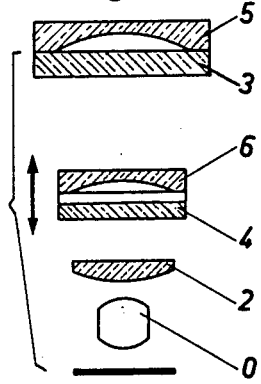
FIGURE 4a shows the assembled relationship of the lenses of the apparatus in accordance with FIGS. 3 and 4.

In FIGURE 3, an arrangement similar to that shown in FIGURES 1 and 2 is illustrated, but with the difference that here the lens 1 in accordance with FIG. 1 is divided into two lenses 5 and 6, the axes of which are parallel to each other. If the two lens systems of FIGURES 3 and 4 are packed in each other, there is again produced an arrangement which has the same properties and gives the same effects characteristic of the invention and which have been explained with the aid of FIGURES 1 and 2. However, the focusing is, in the case of the embodiment of FIG. 4a, effected by a common movement of the lenses 4 and 6 in the same direction. It should be mentioned that the distance between the cylindrical lenses 3 and 4 of the expanding group in FIGURE 4 may be made equal to the distance between the two negative cylindrical lenses 5 and 6 of the compressing group. The second negative cylindrical lens 6 is then arranged so as to be immediately next to the lens 4. The two lenses 4 and 6 have the same focal length.

Figure 5:
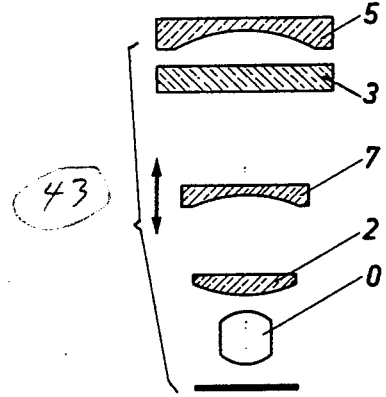
FIGURE 5 shows a further embodiment of the invention in cross-section.

FIGURE 5 illustrates a lens system according to the invention which corresponds substantially to the embodiment illustrated by FIGURES 3 and 4. However, in FIGURE 5, the two cylindrical lenses 4 and 6 have been replaced by a single spherical lens 7 of the same focal length. The focussing is effected by displacing the lens 7.

Figure 6:
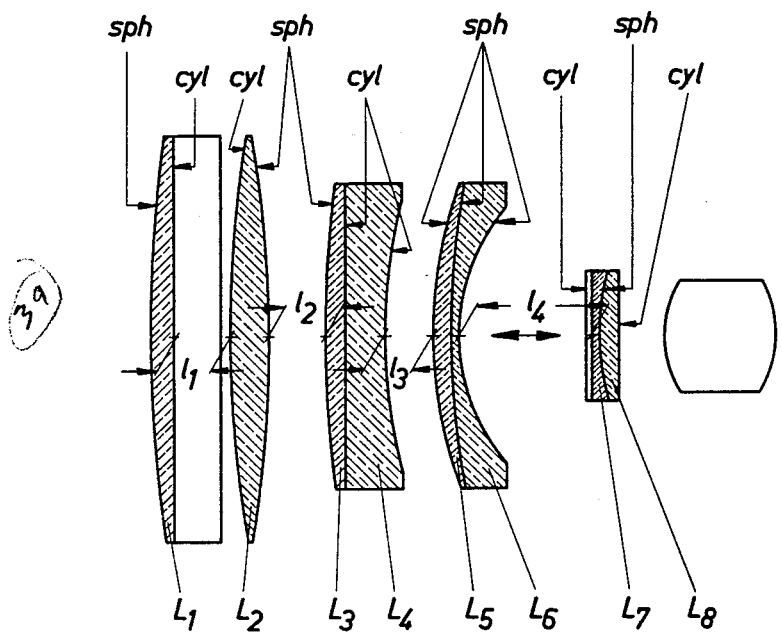
FIGURES 6 and 7 show the embodiment according to FIGURE 5 in two cross-sections at right angles to each other, but with achromatic lenses and additional curvatures for the elimination of picture errors.
Figure 7:
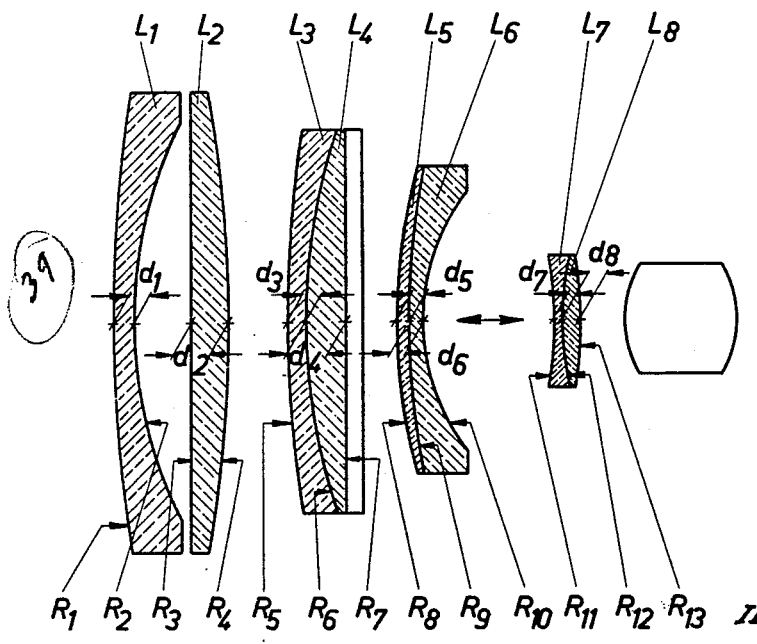

FIGURES 6 and 7 show an arrangement according to FIGURE 5 but showing achromatic lenses and additional curvature for obviating image defects.

The lenses $L_1$, $L_2$, $L_6$, $L_8$ correspond to the lenses 5, 3, 7, 2 (FIGURE 5) chosen in the same order. The lenses $L_3$ and $L_4$ are the crown-glass and flint lenses, the axes of the cylindrical planes of which cross each other at right angles and which are cemented together, for achromatising lenses $L_1$, $L_2$. The lenses $L_5$, $L_7$ are the achromatising lenses of the lenses $L_6$, $L_8$.

In FIGURE 6, it is stated on every lens surface whether it is spherical or cylindrical. L denotes the distances of the individual lenses from one another, $d$ denotes the thickness and R denotes the radii of the lenses.

By way of example, the following table shows, for the individual lenses, of a new anamorphotic objective of a focal length of 40 mms., the values of the radii R, the refractive index, and the Abbe number as well as the values of the distances $l$ and of the thicknesses $d$. The individual values given in the table have been ascertained either mathematically, in accordance with known optical laws, or empirically. They may be varied while maintaining conformity with these laws.

| Lens | Radii | Refractive Index $n$ | Abbe number $\nu$ | Distances $l$ | Thicknesses $d$ |
|---|---|---|---|---|---|
| $L_1$ | $R_1 = +554$ sph | $n=1.5225$ | 59.64 | | $d_1=4$ |
| | $R_2 = +67.5$ cyl | | | $l_1=11.8$ | |
| $L_2$ | $R_3 = +173$ cyl | $n=1.5225$ | 59.64 | | $d_2=6$ |
| | $R_4 = -1,280$ sph | | | $l_2=9.1$ | |
| $L_3$ | $R_5 = +332$ sph | $n=1.5225$ | 59.64 | | $d_3=5$ |
| | $R_6 = +87.5$ cyl | | | | |
| $L_4$ | $R_7 = +245$ cyl | $n=1.6200$ | 36.34 | $l_3=2.3$ to 23.5 | $d_4=13.7$ |
| $L_5$ | $R_8 = +68.5$ sph | $n=1.6200$ | 36.34 | | $d_5=3.2$ |
| $L_6$ | $R_9 = +89$ sph | $n=1.5567$ | 58.54 | | $d_6=1.0$ |
| | $R_{10}=+39$ sph | | | $l_4=53.8$ to 26.1 | |
| $L_7$ | $R_{11}=-245$ cyl | $n=1.6200$ | 36.34 | | $d_7=1.0$ |
| $L_8$ | $R_{12}=+174$ sph | $n=1.5225$ | 59.64 | | $d_8=2.5$ |
| | $R_{13}=-74$ cyl | | | | |

I claim:

An anamorphic optical system comprising an objective in combination with an afocal anamorphic lens system including a first anamorphoser adapted to produce an image compression in a first direction and a second anamorphoser adapted to produce an image expansion in a second direction at right angles to said first direction, the image compression factor in said first direction and the image expansion factor in said second direction having a quotient equal to the desired anamorphic factor of the system and wherein said first anamorphoser comprises a rear positive cylindrical component and two spaced apart negative cylindrical components while the second anamorphoser comprises a pair of spaced apart cylindrical components one of negative power and the other of positive power, the rear negative component of said first anamorphoser and the negative component of said second anamorphoser having equal power and being arranged to be situated at a common point on the optical axis of the system and being constituted by a single spherical lens component and thereby adapting said spherical lens component for common focussing adjustment along the optical axis of the system, and wherein the anamorphic lens system has two achromatic rear lens components including an afocal achromatising doublet consisting of a cemented pair of cylindrical lenses of different dispersion and having their cylinder axis at right angles to one another and aligned with said first and second directions to achromatize the other lens components of the system, said five lens components being so shaped and arranged that the lens radii R, the refractive index $n$, the Abbe number, the distances $l$ between the lens components and the thickness $d$ of the lens components have the values set forth in the following table, each category being numbered by subscripts in order from front to rear:

| | R | $n$ | Abbe number $\nu$ | $l$ | $d$ |
|---|---|---|---|---|---|
| $L_1$ | $R_1 = +554$ sph | $n = 1.5225$ | 59.64 | | $d_1 = 4$ |
| | $R_2 = +67.5$ cyl | | | $l_1 = 11.8$ | |
| $L_2$ | $R_3 = +173$ cyl | $n = 1.5225$ | 59.64 | | $d_2 = 6$ |
| | $R_4 = -1,280$ sph | | | $l_2 = 9.1$ | |
| $L_3$ | $R_5 = +332$ sph | $n = 1.5225$ | 59.64 | | $d_3 = 5$ |
| $L_4$ | $R_6 = +87.5$ cyl | $n = 1.6200$ | 36.34 | | $d_4 = 13.7$ |
| | $R_7 = +245$ cyl | | | $l_3 = 2.3$ to $23.5$ | |
| $L_5$ | $R_8 = +68.5$ sph | $n = 1.6200$ | 36.34 | | $d_5 = 3.2$ |
| $L_6$ | $R_9 = +89$ sph | $n = 1.5567$ | 58.54 | | $d_6 = 1.0$ |
| | $R_{10} = +39$ sph | | | $l_4 = 53.8$ to $26.1$ | |
| $L_7$ | $R_{11} = -245$ cyl | $n = 1.6200$ | 36.34 | | $d_7 = 1.0$ |
| $L_8$ | $R_{12} = +174$ sph | $n = 1.5225$ | 59.64 | | $d_8 = 2.5$ |
| | $R_{13} = -74$ cyl | | | | |

References Cited in the file of this patent

UNITED STATES PATENTS

| | | |
|---|---|---|
| 1,971,457 | Maurer | Aug. 28, 1934 |
| 2,428,399 | Timoney | Oct. 7, 1947 |
| 2,752,821 | Cook | July 3, 1956 |
| 2,933,017 | Kingslake et al. | Apr. 19, 1960 |

FOREIGN PATENTS

| | | |
|---|---|---|
| 8,512 | Great Britain | 1898 |
| 1,082,780 | France | June 23, 1954 |
| 533,337 | Italy | Sept. 21, 1955 |
| 4,058 | Germany | Dec. 22, 1955 |
| 1,028,802 | Germany | Apr. 24, 1958 |